United States Patent
Lin et al.

(10) Patent No.: US 7,049,791 B2
(45) Date of Patent: May 23, 2006

(54) BATTERY ENERGY BALANCE CIRCUIT AND BATTERY CHARGING BYPASS CIRCUIT

(75) Inventors: Pao-Chuan Lin, Hsinchu (TW); Chun-Hsien Lee, Hsinchu (TW); Yi-Shuo Huang, Hsinchu (TW); Chung-Lin Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 296 days.

(21) Appl. No.: 10/718,545

(22) Filed: Nov. 24, 2003

(65) Prior Publication Data

US 2005/0029987 A1    Feb. 10, 2005

(30) Foreign Application Priority Data

Aug. 8, 2003    (TW) .............................. 92121816 A

(51) Int. Cl.
   *H02J 7/00*    (2006.01)
(52) U.S. Cl. ..................................... 320/121; 320/116
(58) Field of Classification Search ................ 320/121, 320/116, 124

See application file for complete search history.

(56) References Cited

U.S. PATENT DOCUMENTS

| | | | |
|---|---|---|---|
| 5,479,083 A | 12/1995 | Brainard | |
| 5,659,237 A | 8/1997 | Divan et al. | |
| 5,666,041 A | 9/1997 | Stuart et al. | |
| 5,982,143 A | 11/1999 | Stuart | |
| 6,008,623 A | 12/1999 | Chen et al. | |
| 6,150,795 A | 11/2000 | Kutkut et al. | |
| 6,222,344 B1 | 4/2001 | Peterson et al. | |
| 6,356,055 B1* | 3/2002 | Lin et al. ..................... | 320/116 |

* cited by examiner

*Primary Examiner*—Pia Tibbits
(74) *Attorney, Agent, or Firm*—Birch, Stewart, Kolasch & Birch, LLP

(57) ABSTRACT

A battery energy balance circuit and a battery charging bypass circuit is disclosed for batteries being charged at the same time to be charged equally. When the terminal voltages of the batteries are different, a controllable power device switch in the circuit switches on and off at a high frequency in order to reduce the input current to the batteries with higher terminal voltages and to increase the input current to the batteries with lower terminal voltages, achieving the goal of equal charging. The disclosed energy balance circuit can avoid damages to the batteries as a result of overcharging. When the number of batteries increases, one can expand the system in a modularized way to prevent inconvenience of circuit designs.

22 Claims, 9 Drawing Sheets

BATTERY ENERGY BALANCE CIRCUIT AND BATTERY CHARGING BYPASS CIRCUIT

This Nonprovisional application claims priority under 35 U.S.C. § 119(a) on Patent Application No(s). 092121816 filed in TAIWAN on Aug. 8, 2003, the entire contents of which are hereby incorporated by reference.

BACKGROUND OF THE INVENTION

1. Field of Invention

The invention relates to a energy balance circuit and a charging bypass circuit for batteries and, in particular, to a energy balance circuit and a charging bypass circuit that can equally charge a set of batteries connected in series.

2. Related Art

Many applications require the use of many batteries connected in series. However, due to different characters and residual energy in batteries, they have to be properly matched. If the residual energy in the batteries connected in series is different, those with more residual energy are likely to be overcharged and damaged while those with smaller residual energy are not charged to full when they are charged in series. When discharging, those batteries not charged in full are likely to overdischarge to damage the batteries. Therefore, how to avoid such problems is an important issue for serial battery sets.

To protect the battery set, the simplest method is to connect to each battery a resistor and a control switch in parallel. FIG. 1 shows an example with a battery set of three batteries. It includes a charging circuit CHR. The battery set is comprised of a first battery B1, a second battery B2, and a third battery B3 connected in series. The first battery B1 is connected in parallel a first resistor R1 and a first switch SW1. The second battery B2 is connected in parallel a second resistor R2 and a second switch SW2. The third battery B3 is connected in parallel a third resistor R3 and a third switch SW3.

When charging, if the terminal voltage of any battery reaches a predetermined value, the corresponding switch is turned on. Suppose the voltage of the second voltage B2 reaches the predetermined value, the second switch SW2 is turned on. The second resistor R2 can be shown as connected to the second battery B2 in parallel. In such a way, the current originally flowing through the second battery B2 is reduced because part of it flows through the second resistor R2. This can avoid overcharging.

The circuit shown in FIG. 1 produces heat as the current flows through the resistor. Therefore, it cannot process large branch currents.

To solve such problems, the U.S. Pat. No. 5,479,083 improved the above-mentioned dissipative method and provided with a non-dissipative energy balance circuit. The circuit structure is shown in FIG. 2, including a first battery B1 and a second battery B2 connected in series, and a first switch SW1 and a second switch SW2 connected in series. The battery set and the switch set are connected in parallel. One end of an inductor L is coupled between the first battery B1 and the second battery B2, the other end is coupled between the first switch SW1 and the second switch SW2. The basic principle is that the first switch SW1 and the second switch SW2 are turned on and off in an alternative way so that the terminal with a higher voltage discharges while that with a lower voltage is charged in this circuit. When the first switch SW1 is on, the first battery B1 and the inductor L form a loop. When the second switch SW2 is on, the second battery B2 and the inductor L form a loop. Therefore, the bypass charging/discharging current is of pulse nature.

FIG. 3 illustrates another energy balance circuit with the similar idea of FIG. 2, which is disclosed in the U.S. Pat. Nos. 6,150,795 and 6,222,344. The switches SW1 and SW2 are on and off simultaneously, or only the switch corresponding to the battery with a larger terminal voltage is activated. If the terminal voltage of the first battery B1 is larger, the first switch is turned on and off at a high frequency. In this way, the energy in the first battery B1 is transferred to the second battery B2 through the circuit. The energy transfer is possible only when the first switch SW1 and the second switch SW2 are on. Its transfer method is different from that of the U.S. Pat. No. 5,479,083. However, it also has pulse currents.

The U.S. Pat. No. 5,659,237 also discloses an energy balance circuit that distributes a total energy in an even way. Its main technical feature is to redistribute the energy in a battery set through a circuit to each of the batteries. Batteries with smaller terminal voltages get more energy while those with larger terminal voltages get less energy. Therefore, this circuit can achieve the goal of making the terminal voltage of each battery in the battery set the same.

The transformer in the U.S. Pat. Nos. 6,008,623 and 5,659,237 is changed to several independent ones. The basic idea of the U.S. Pat. No. 5,666,041 is the same as the U.S. Pat. No. 5,659,237. It also redistributes the serial battery set energy. The only difference is in the structure of the transformer. In order for the batteries with smaller terminal voltages to be given more energy, the U.S. Pat. No. 5,982,143 further includes a switch connected in series in front of a diode.

The battery energy balance circuit disclosed in the prior art few has the modularized property. When the number of battery sets increases, the design of the whole balance circuit has to be modified and the number of windings has to change too. Therefore, it is not economical in practice. Moreover, the charging and discharging currents in the circuit of the prior art are all pulse currents.

SUMMARY OF THE INVENTION

In view of the foregoing, an objective of the invention is to provide a energy balance circuit for battery sets to improve technical problems in the prior art and to protect batteries from being damaged because of overcharging or overdischarging.

To achieve above objective, the disclosed energy balance circuit and the battery set are connected in parallel. When the terminal voltages of the batteries are different, the switches are turned on and off in a rapid way so that energy from batteries with higher terminal voltages are transferred to those with lower terminal voltages. Therefore, each battery in the battery set eventually has the equal voltage.

The disclosed energy balance circuit can be applied to the battery energy equalization device connected in series to the battery set. When the battery set is charging, such a device can be viewed as a bypass circuit so that no battery will be damaged because of overcharging. It has the advantage of being modularized. In comparison with the prior art, the charging current produced by the disclosed energy balance circuit is not a pulse current.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
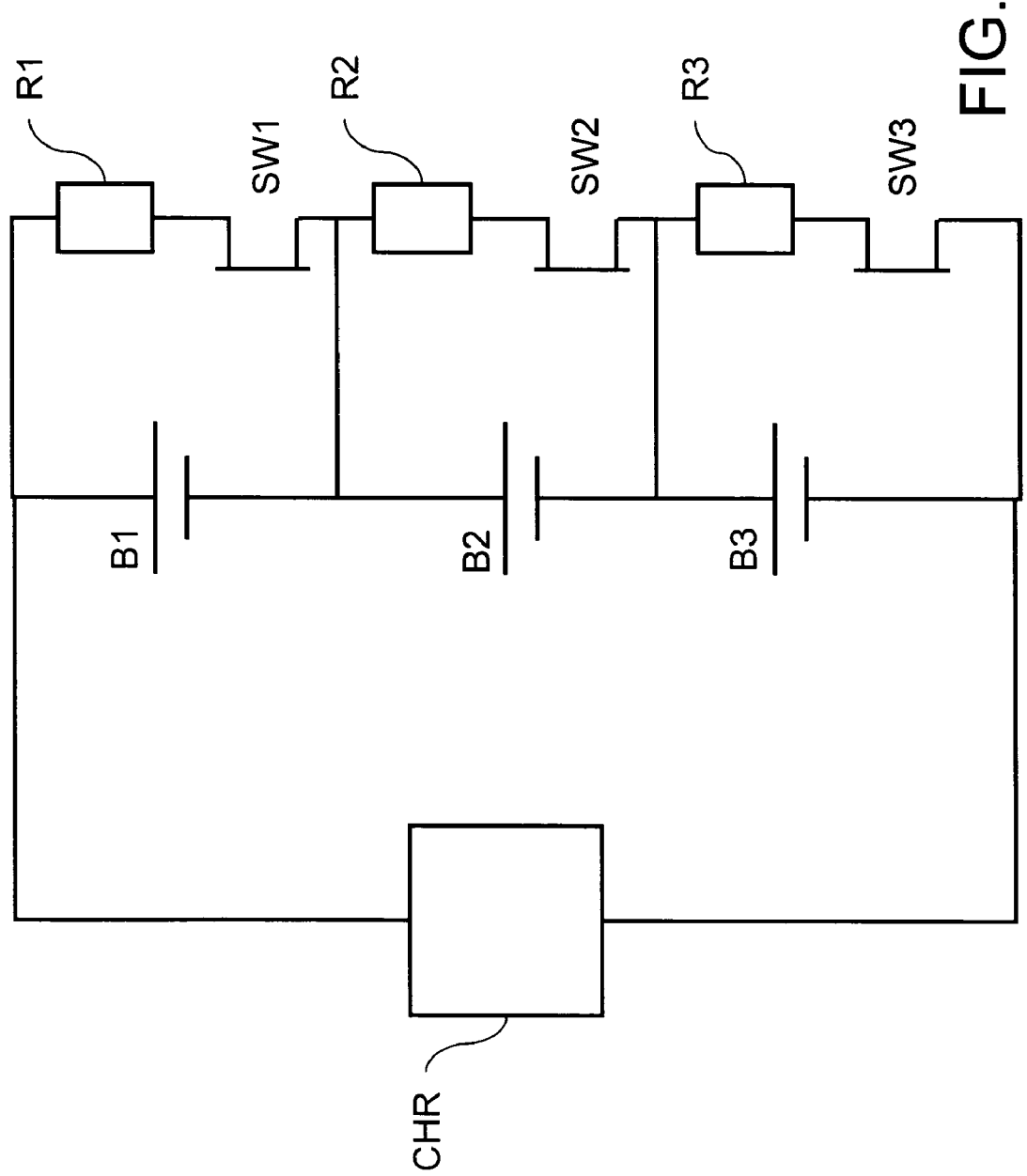
FIG. 1 is a battery energy balance circuit in the prior art.
Figure 2:
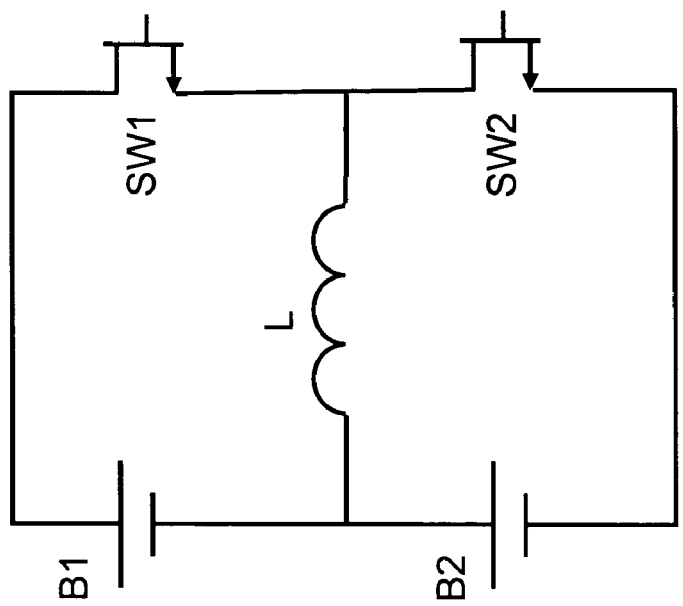
FIG. 2 is another battery energy balance circuit in the prior art.
Figure 3:
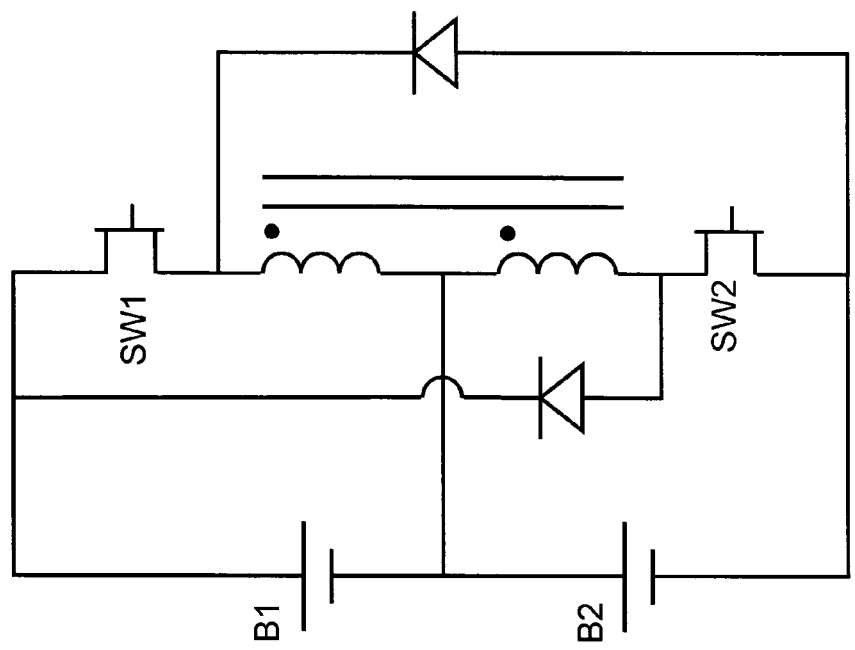
FIG. 3 is yet another battery energy balance circuit in the prior art.
Figure 4:
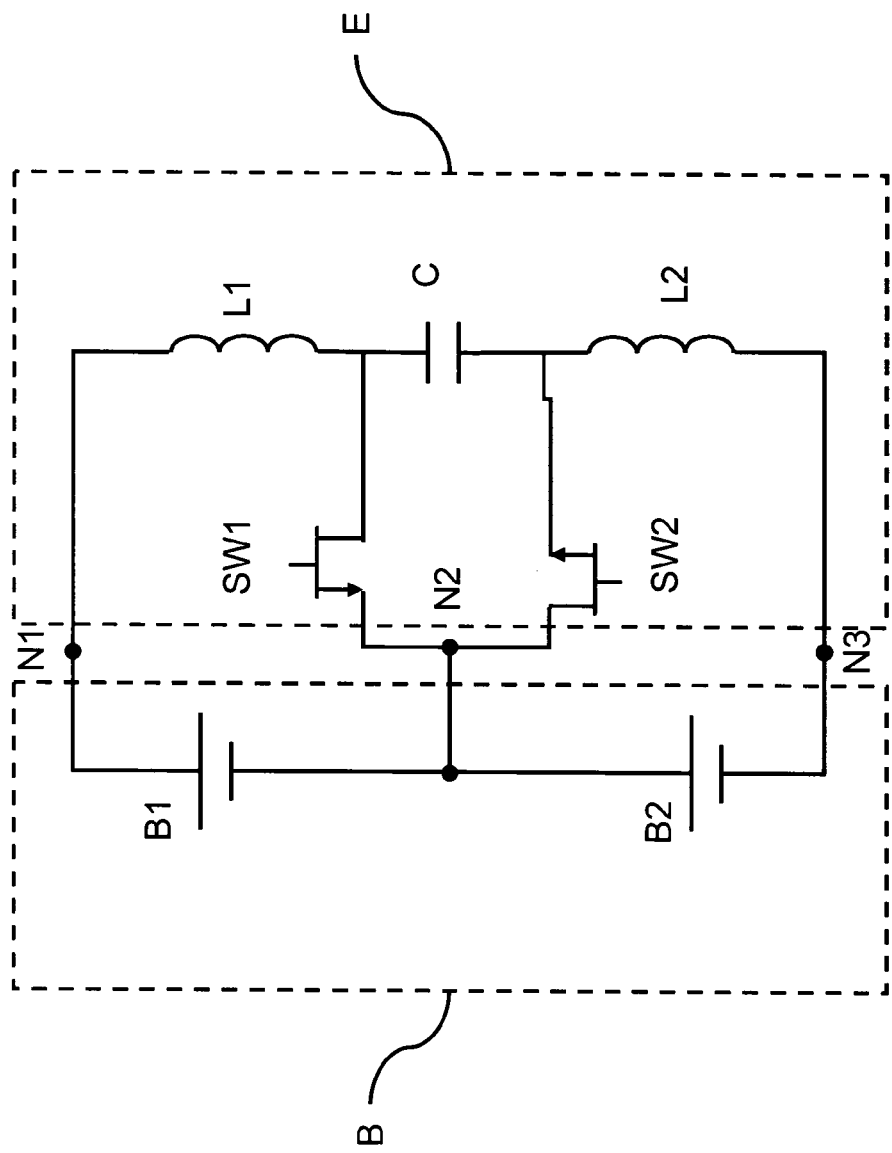
FIG. 4 shows the first embodiment of the disclosed energy balance circuit.

Please refer to FIG. 4 for the disclosed battery set energy balance device. As shown in the drawing, the energy circuit E has an upper node N1, a middle node N2, and a lower node N3. The battery set B is connected to the energy balance circuit E via the upper node N1, the middle node N2, and the lower node N3 in parallel. In the current embodiment, the battery set B is comprised of a first battery B1 and a second battery B2 connected in parallel. Corresponding to the number of batteries in the battery set, the energy balance device E includes a first current storage device L1 and a second current storage device L2, a first switch SW1 and a second switch SW2, and a voltage storage device C.

The first current storage device L1 and the second current storage device L2 are energy storage devices that can hold energy in a magnetic field. When current flows through such a device, energy is stored in the magnetic field generated by the device. A preferred embodiment uses inductors as such devices. In the first embodiment, the inductors are non-coupled inductors.

The voltage storage device C is an energy storage device that can hold energy in an electric field. When current flows through the device, energy is stored in the electric field generated by the device. Such a device is preferably a capacitor.

The first current storage device L1, the voltage storage device C, and the second current storage device L2 are connected in series. The voltage storage device C is coupled between the first current storage device L1 and the second current storage device L2. The other end of the first current storage device L1 is connected to the upper node N1. The other end of the second current storage device L2 is connected to the lower node N3. The upper node N1 is connected to the positive output terminal of the battery set B. The lower node N3 is connected to the negative output terminal of the battery set B.

The first switch SW1 and the second switch SW2 are controllable power element switches. They can be MOSFET, IGBT or BJT switch devices that are built in with a bypass diode. In the current embodiment of the invention, we use the MOSFET as an example.

One end of the first switch SW1 is coupled between the first current storage device L1 and the voltage storage device C. The other end is coupled between the first battery B1 and the second battery B2 through the middle node N2. One end of the second switch SW2 is coupled between the second current storage device L2 and the voltage storage device C. The other end is coupled between the first battery B1 and the second battery B2. Using the MOSFET as a switch, the drain of the first switch SW1 is coupled to the first current storage device L1 and the voltage storage device C. Its source is coupled between the first battery B1 and the second battery B2. The source of the second switch SW2 is coupled between the first current storage device L1 and the voltage storage device C. Its drain is coupled between the first battery B1 and the second battery B2. In other words, the drains and sources of the first switch SW1 and the second switch SW2 are coupled to one another.

The on and off of the first switch SW1 and the second switch SW2 can be controlled by an oscillator. Taking the MOSFET in the current embodiment as an example, its gate is connected to the oscillator.

Figure 6:
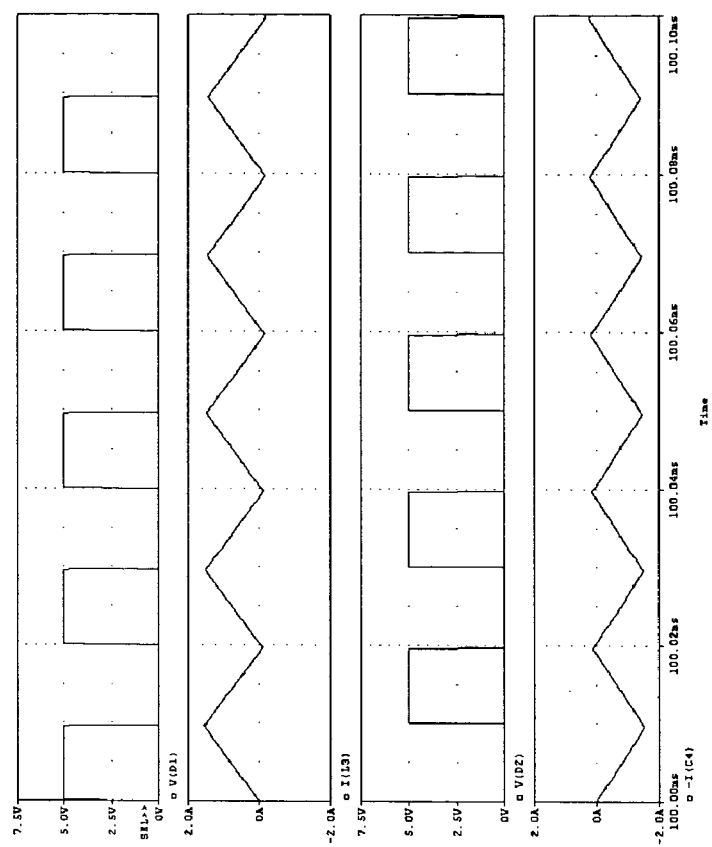
FIG. 6 shows simulated battery voltage and current storage device current in the first embodiment.
Figure 6:
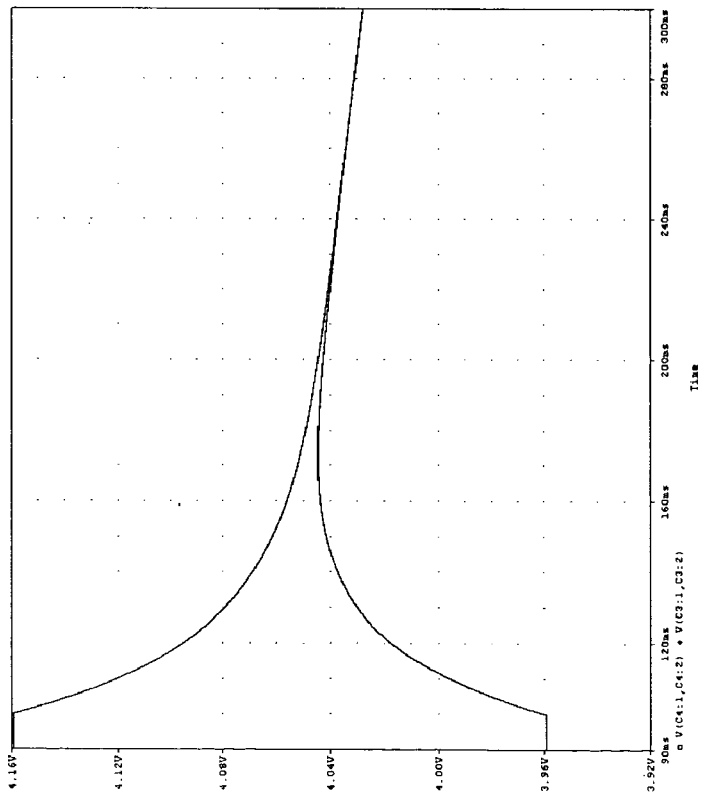

In the following, we describe how the disclosed energy balance circuit functions. The driving signal of the first switch SW1 and the second switch SW2 is shown in FIG. 6.

Before the switches actuate, the voltage different between the two ends of the voltage storage device C is VC and VC=Vb1+Vb2. Now consider the situation where only the switch corresponding to the battery with a higher voltage is driven. Without loss of generality, suppose the battery B2 has a higher terminal voltage. When the second switch SW2 is on, part of the electrical energy inside the second battery B2 is transferred to the second current storage device L2. At the same moment, the energy in the voltage storage device C discharges its energy to the first battery B1 via the first current storage device L1. Therefore, the first battery B1 is being charged by the energy in the voltage storage device C.

When the second switch SW2 is on, the terminal voltage across the second current storage device L2 is VB2. The voltage difference between the two ends of the voltage storage device C is VC. The voltage across the first current storage device L1 is then VB1−VC=−VB2.

When the second switch SW2 is off, the first current storage device L1 and the second current storage device L2 cannot be instantaneously off, forcing the built-in bypass diode of the first switch SW1 to be conductive. The voltage across the second current storage device L2 is VB2−VC=−VB1. The voltage difference between the two ends of the first current storage device L1 is VB1.

According to the volt-sec balance principle, the volt-sec is not balanced within one period. Therefore, the current in the current storage device L2 increases. On the other hand, the current in the first current storage device L1 increases in the negative direction. In this method, the energy in the second battery B2 is transferred to the first battery B1 via the circuit E.

Figure 5:
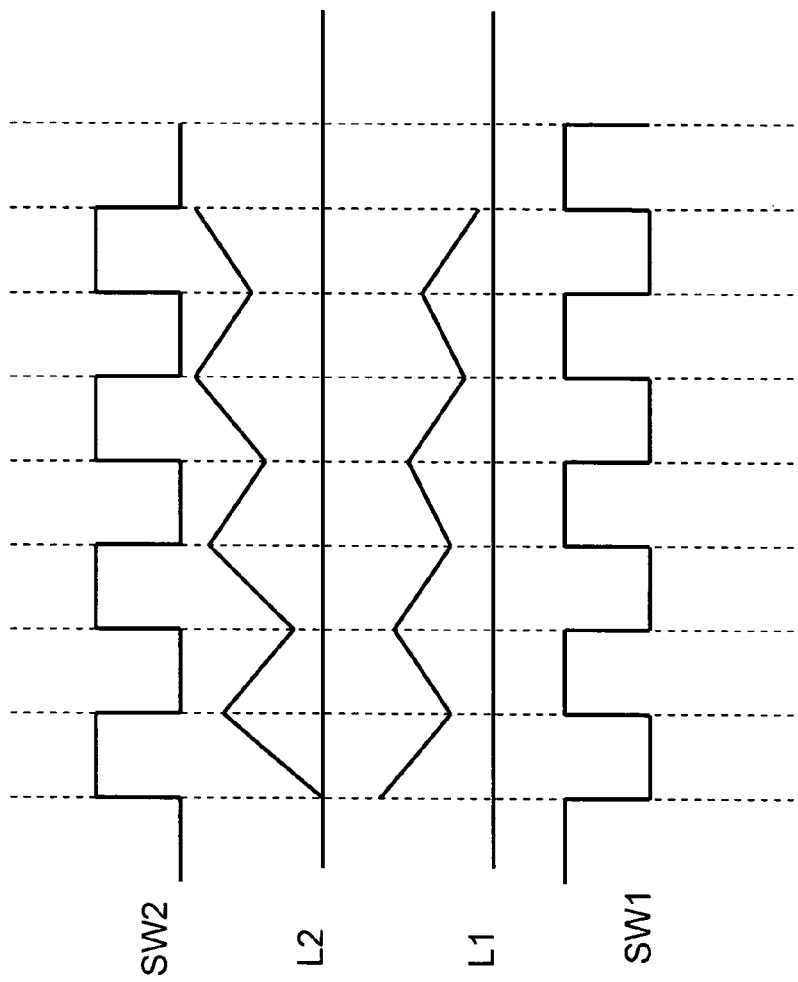
FIG. 5 shows a driving waveform and a charging current used in the first embodiment.

As the first switch SW1 and the second switch SW2 alternate, the built-in bypass diode in the first switch SW1 is on when the second switch SW2 is off. Thus, let the first switch SW1 turn on, making the voltage drop of the drain and source VDS of the first switch SW1 smaller than the bypass diode. The current waveform is shown in FIG. 6, too. From FIG. 5, we know that the currents in the first current storage device L1 and the second current storage device L2 are non-pulse currents. The first current storage device L1 is connected to the positive terminal of B; and the second current storage device L2 is connected to the negative terminal of B. This means that the absorbed or feedback current of battery B1 or B2 from or to the bypass circuit is a continuous current.

FIG. 6 shows a simulated voltage of the battery and currents of the current storage devices. One can see from the drawing that the simulated experimental result is similar to FIG. 5.

When the battery set is charging, if the terminal voltages of the batteries are different high-speed on and off of a controllable power device switch can reduce the charging current to the battery with a higher terminal voltage, thereby increasing the charging current of that with a lower terminal voltage. This is why the disclosed energy balance circuit can be considered as a current bypass circuit.

Figure 7:
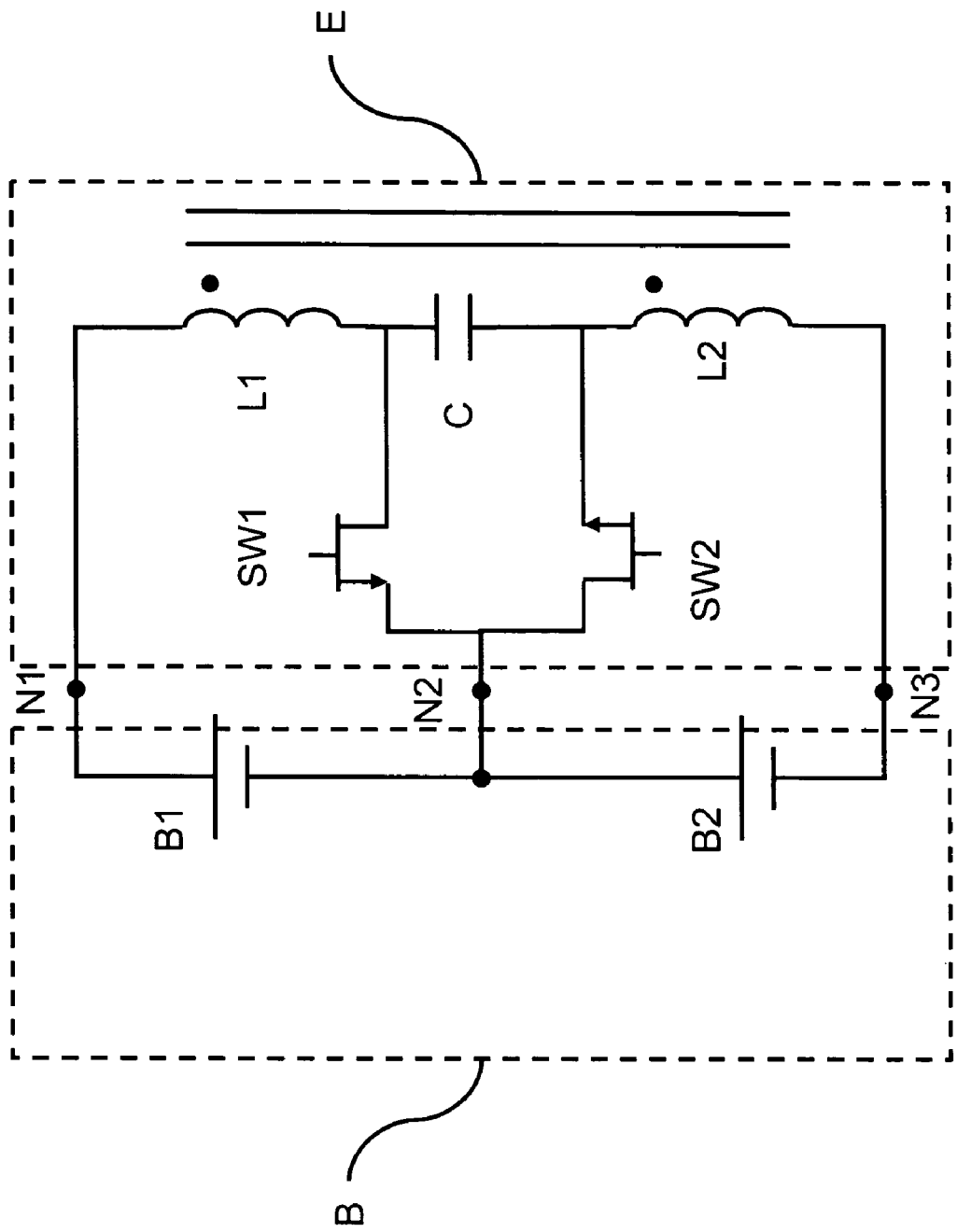
FIG. 7 shows the second embodiment of the disclosed energy balance circuit.

Moreover, the first current storage device L1 and the second current storage device L2 can share one iron core, coiling to form a transformer. That is, the embodiment adopts a coupled inductor. The circuit is shown in FIG. 7. The operation detail is the same as the first embodiment. For the simulated battery voltage and the current storage device current, please refer to FIG. 8.

Figure 8:
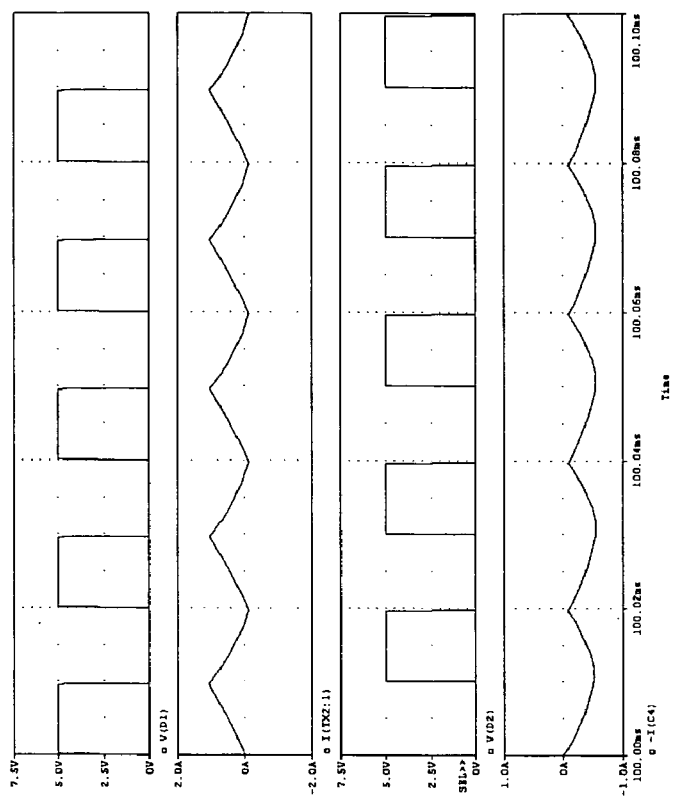
FIG. 8 shows simulated battery voltage and current storage device current in the second embodiment.
Figure 8:
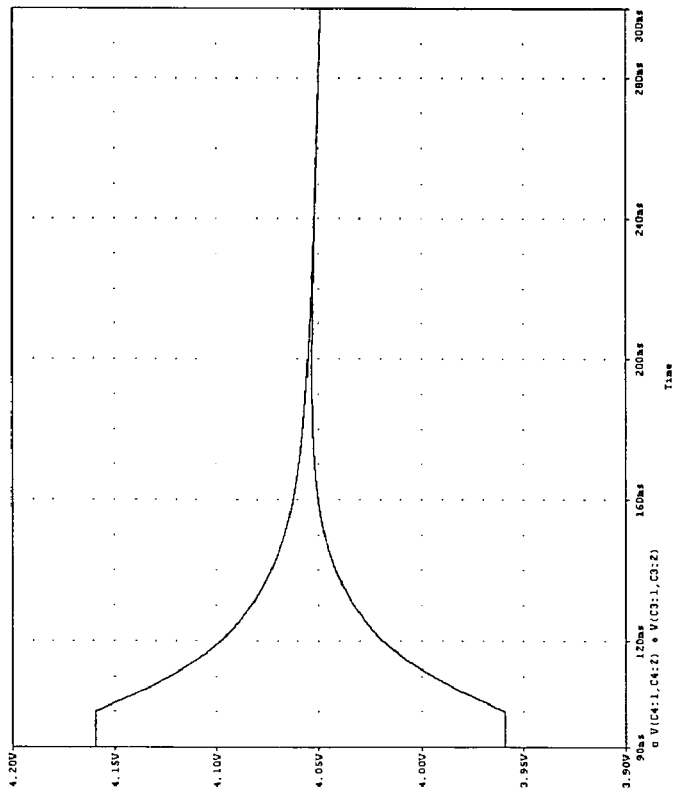

From FIG. 6 and FIG. 8 one can see that when the terminal voltages of the first battery B1 and the second battery B2 are different, the first switch SW1 and the second switch SW2 alternately turn on and off to reach equal terminal voltages on the batteries. Taking FIG. 6 as an example, when the terminal voltage of the second battery B2 is larger than that of the first battery B1, the second switch SW2 is on, making the second battery B2, the second switch SW2, and the second current storage device L2 form a loop. The energy inside the battery B2 releases to charge the second current storage device L2 via the loop. The second current storage device L2 is thus being charged. At the same time, the energy in the voltage storage device C discharges to the first battery B 1 via the first current storage device. Therefore, the first battery B1 is being charged. When the second switch SW2 is off, the second current device L2 charges the bypass diode via the first switch and the first current storage device L1 keeps discharging to the first battery B1. Through the continuous charging and discharging process, the terminal voltages of the first battery B1 and the second battery B2 become equal.

Figure 9:
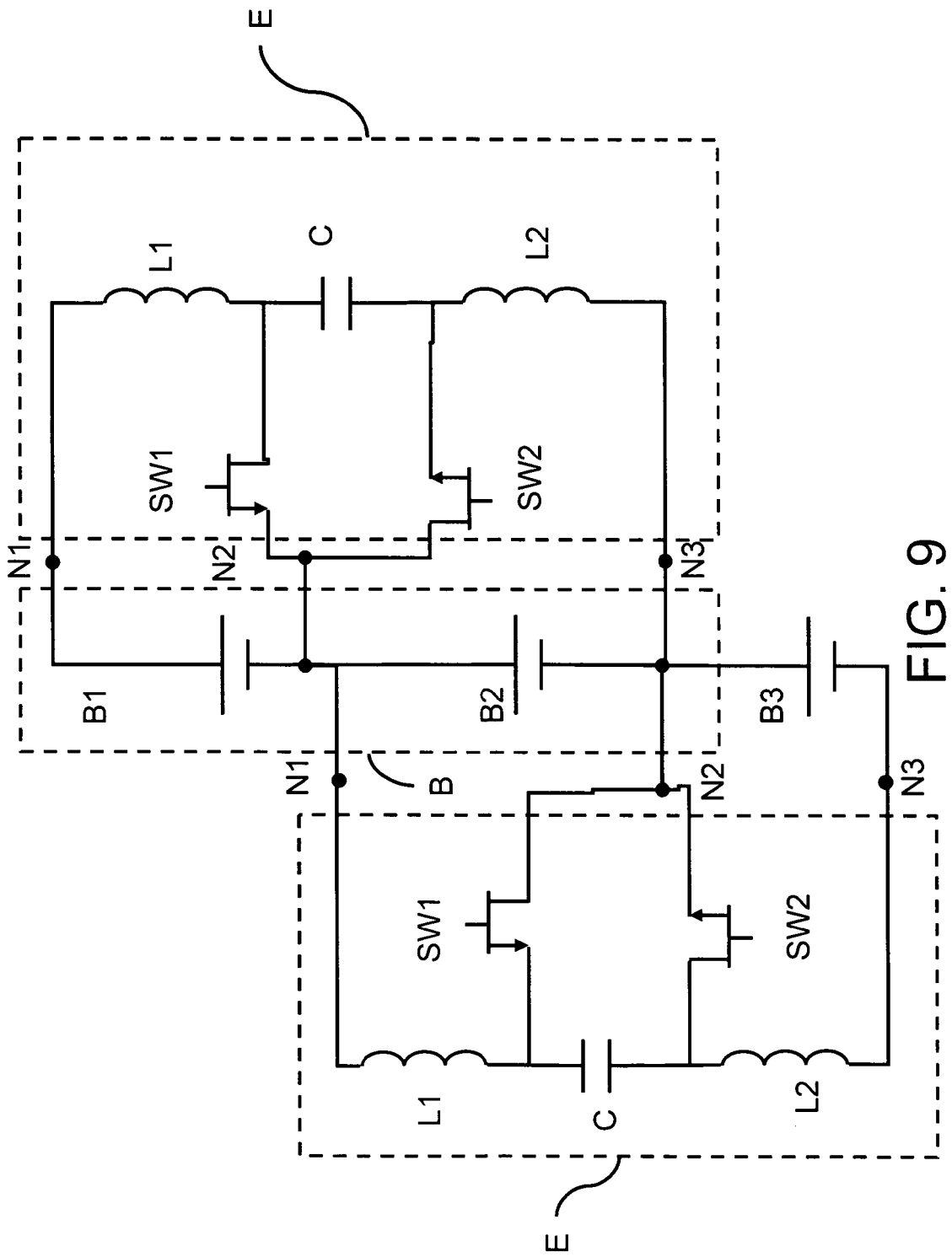
FIG. 9 shows the second embodiment of the disclosed energy balance circuit, using a battery set with more than two batteries.

Furthermore, refer to FIG. 9 for the circuit diagram of the invention applied to a battery set with more than two batteries. As shown in the drawing, the battery set contains a first battery B1, a second battery B2, and a third battery B3. When one more battery is included, the energy balance circuit E also increases by one correspondingly.

In the battery set B with only two batteries, the upper node N1 on the energy balance circuit E is connected to the positive pole of the first battery and the lower node N3 is connected to the negative pole of the second (also the last) battery. The middle node N2 is connected between the first and second batteries.

When the battery set B has three batteries, there is one more energy balance circuit correspondingly. If there are N batteries in the battery set, there should be N-1 energy balance circuits E. The N batteries are connected in series. Each of the N-1 energy balance circuits is connected to the N serial batteries in parallel in an overlapped way. Explicitly, the upper node N1 of the first energy balance circuit is connected to the positive pole of the first battery in the battery set. Its lower node N3 is connected to the negative pole of the second battery. Its middle node N2 is connected between the first and second batteries. The upper node of the next energy balance circuit is connected to the middle node of the previous energy balance circuit, the middle node of the next energy balance circuit to the lower node of the previous energy balance circuit. Between each two consecutive batteries is connected with the middle node of a energy balance circuit and the lower node of its previous energy balance circuit.

Certain variations would be apparent to those skilled in the art, which variations are considered within the spirit and scope of the claimed invention.

What is claimed is:

1. An energy balance circuit for a charger to evenly charge a battery set with a first battery and a second battery connected in series, comprising:
   a first current storage device, whose one end is coupled to the positive output terminal of the battery set;
   a voltage storage device, which is coupled to the first current storage device in series using one end;
   a second current storage device, which is coupled to the voltage storage device in series using one end and coupled to the negative output terminal of the battery set using the other end;
   a first switch, whose one end is coupled between the first current storage device and the voltage storage device and the other end coupled between the first battery and the second battery; and
   a second switch, whose one end is coupled between the second current storage device and the voltage storage device, and the other end coupled between the first battery and the second battery;
   wherein the switches are rapidly turned on and off in such a way that the switch corresponding to the battery with a higher terminal voltage is turned on and off at a high frequency so that the energy in the battery with the higher terminal voltage charges the corresponding current storage device and the energy stored in the voltage storage device charges the battery with the lower terminal voltage.

2. The circuit of claim 1, wherein the first switch and the second switch are turned on and off alternately.

3. The circuit of claim 1, wherein the first switch is a controllable power switch.

4. The circuit of claim 1, wherein the second switch is a controllable power switch.

5. The circuit of claim 1, wherein the first current storage device is an inductor.

6. The circuit of claim 1, wherein the second current storage device is an inductor.

7. The circuit of claim 1, wherein the voltage storage device is a capacitor.

8. The circuit of claim 1, wherein the first and the second current storage devices are coupled inductors.

9. A battery set module, comprising:
   a plurality of batteries connected in series to form a battery set;
   a plurality of balance charging loops, each of which is connected to the batteries in parallel and contains a switch and a current storage device connected in series; wherein one end of the switch is coupled to the positive output terminal of the battery and the other end coupled to the current storage device, and the other end of the current storage device is coupled to the negative output terminal of the battery; and
   a voltage storage device coupled between the current storage devices;
   wherein the switches are turned on and off at a fixed frequency in such a way that the switch corresponding to the battery with a higher terminal voltage is turned on and off at a high frequency so that the energy in the battery with the higher terminal voltage charges the corresponding current storage device and the energy stored in the voltage storage device charges the battery with the lower terminal voltage.

10. The battery set module of claim 9, wherein the switches in the balance charging loops are turned on and off alternately.

11. The battery set module of claim 9, wherein each of the switches is a controllable power switch.

12. The battery set module of claim 9, wherein the current storage device is an inductor.

13. The battery set module of claim 9, wherein the voltage storage device is a capacitor.

14. The battery set module of claim 9, wherein the switches are turned on and off alternately at a high frequency.

15. A battery set module with a charger to charge serially connected batteries evenly, comprising:

N batteries, which are connected in series; and

N-1 energy balance circuits, each of which has an upper node, a middle node, and a lower node;

wherein each of the energy balance circuits is connected to the batteries in parallel Through the upper node, the middle node, and the lower node in an overlapped fashion, so that the upper node N3 of the first energy balance circuit is connected to the positive pole of the first battery, its lower node N3 is connected to the negative pole of the second battery, and the middle node N2 is connected between the first battery and the second battery; and the upper node of each of the successive energy balance circuits is connected to the middle node of its previous energy balance circuit, the middle node of each of the successive energy balance circuits is connected to the lower node of its previous energy balance circuit, and the lower mode of each of the successive energy balance circuits is connected to the negative pole of the corresponding battery, until the lower node of the last energy balance circuit is connected to the negative pole of the last battery, wherein the energy balance circuit further comprises:

a first current storage device, whose one end is connected to the upper node of the energy balance circuit;

a voltage storage device, which one end is coupled to the first current storage device in series;

a second current storage device, which is connected to the voltage storage device in series with one end coupling to the lower node of the energy balance circuit;

a first switch, whose one end is coupled between die first current storage device and the voltage storage device and the other end coupled to the middle node of the energy balance circuit; and a second switch, whose one end is coupled between the second current storage device and the voltage storage device, and the other end coupled to the middle node of the energy balance circuit;

wherein the switches are turned on and off at a fixed frequency in such a way that the switch corresponding to the battery with a higher terminal voltage is turned on and off at a high frequency so that the energy in the battery with the higher terminal voltage charges the corresponding current storage device and the energy stored in the voltage storage device charges the battery with the lower terminal voltage.

16. The battery set module of claim 15, wherein the first and second switches are turned on and off alternately and rapidly.

17. The battery set module of claim 15, wherein the first switch is a controllable power switch.

18. The battery set module of claim 15, wherein the second switch is a controllable power switch.

19. The battery set module of claim 15, wherein the first current storage device is an inductor.

20. The battery set module of claim 15, wherein the second current storage device is an inductor.

21. The battery set module of claim 15, wherein the voltage storage device is a capacitor.

22. The battery set module of claim 15, wherein the first and second current storage devices are coupled inductors.

* * * * *